United States Patent
Im et al.

(10) Patent No.: US 7,783,851 B2
(45) Date of Patent: Aug. 24, 2010

(54) METHODS OF REUSING LOG BLOCKS IN NON-VOLATILE MEMORIES AND RELATED NON-VOLATILE MEMORORY DEVICES

(75) Inventors: Jung-Been Im, Gyeonggi-do (KR); Hye-Young Kim, Seoul (KR)

(73) Assignee: Samsung Electronics Co., Ltd. (KR)

(*) Notice: Subject to any disclaimer, the term of this patent is extended or adjusted under 35 U.S.C. 154(b) by 762 days.

(21) Appl. No.: 11/565,009

(22) Filed: Nov. 30, 2006

(65) Prior Publication Data
US 2008/0098192 A1    Apr. 24, 2008

(30) Foreign Application Priority Data
Oct. 19, 2006    (KR) ...................... 10-2006-0101643

(51) Int. Cl.
*G06F 12/00* (2006.01)
(52) U.S. Cl. .................. 711/165; 711/103; 711/170
(58) Field of Classification Search .................. None
See application file for complete search history.

(56) References Cited

U.S. PATENT DOCUMENTS

| | | | | |
|---|---|---|---|---|
| 6,105,103 | A | * | 8/2000 | Courtright et al. ............. 711/1 |
| 2002/0184436 | A1 | * | 12/2002 | Kim et al. .................... 711/103 |
| 2005/0132127 | A1 | | 6/2005 | Chung et al. |
| 2007/0136510 | A1 | * | 6/2007 | Ippongi ...................... 711/103 |
| 2007/0186032 | A1 | * | 8/2007 | Sinclair et al. .............. 711/103 |

FOREIGN PATENT DOCUMENTS

| | | |
|---|---|---|
| EP | 1 746 510 A1 | 1/2007 |
| JP | 2002-123421 | 4/2002 |
| KR | 10-2002-0092487 A | 12/2002 |
| KR | 10-2005-0056761 A | 6/2005 |
| WO | WO 2005/106673 A1 | 11/2005 |

OTHER PUBLICATIONS

German Office Action (9 pages) corresponding to German Patent Application No. 102007006307.7; Mailing Date: Mar. 31, 2009.
Office Action for corresponding German patent application 10 2007 006 307.7-53; dated Jun. 13, 2007.

* cited by examiner

*Primary Examiner*—Shane M Thomas
*Assistant Examiner*—Ryan Dare
(74) *Attorney, Agent, or Firm*—Myers Bigel Sibley & Sajovec

(57) ABSTRACT

Methods of operating a non-volatile memory device that includes a first data block that stores first data and a first log block that stores an updated version of at least some of the first data is provided in which valid portions of the first data in the first data block are copied to a free block that has no data to generate a second data block. The updated version of at least some of the first data from the first log block is copied to the second data block. The first log block is designated as a reusable log block without erasing the data therefrom in response to at least one predetermined condition being satisfied.

10 Claims, 10 Drawing Sheets

FIG. 9

Reuse Pool Table

| PBN | START ADDRESS OF CLEAN PAGE |
|---|---|
| ⋮ | ⋮ |
| 10 | 12 |
| 1 | 10 |
| 2 | 4 |
| 5 | 12 |
| ⋮ | ⋮ |

METHODS OF REUSING LOG BLOCKS IN NON-VOLATILE MEMORIES AND RELATED NON-VOLATILE MEMORY DEVICES

CROSS-REFERENCE TO RELATED PATENT APPLICATION

This application claims priority under 35 U.S.C. §119 from Korean Patent Application No. 10-2006-0101643, filed on Oct. 19, 2006 in the Korean Intellectual Property Office, the disclosure of which is incorporated herein in its entirety by reference.

FIELD OF THE INVENTION

The present invention relates to non-volatile semiconductor memory devices, and more particularly, to methods of managing non-volatile semiconductor memory devices and related non-volatile memory devices.

BACKGROUND OF THE INVENTION

Flash memory devices are non-volatile memory devices to which data may be electrically written to or erased from. Flash memory based storage devices typically consume less power and/or are smaller than equivalent magnetic disc storage devices. As such, flash-memory based storage devices have been replacing magnetic disc storage devices in many existing and new applications.

Flash memory devices generally do not allow data to be over-written as can typically be done in magnetic disc memory devices. Consequently, to replace data stored in a flash memory device, the stored data is first erased, and then the new data is programmed into the erased memory cells. The "erase" operation may return the memory cell of the flash memory device to its initial state. Thus, flash memory devices generally have three operating modes: a program (write) mode, an erase mode, and a read mode. Herein, an erased flash memory cell or block may also be referred to as a "clean" cell or block.

The erase operation typically takes longer than the programming (i.e., writing) operation. Moreover, the erase operation is typically performed in much larger block units than are the programming or reading operations. As a result, parts of the flash memory for which an erase was not requested may be erased during a block erase operation. When this occurs, the portions of the block for which an erase operation had not been requested may need to be restored by programming the data into another block.

Frequent erase operations may result in an unnecessary increase in an "erase count" of a flash memory device. The "erase count" is a parameter which may significantly influence the life span of a flash memory device. As the erase count and a program count of a flash memory device increase, the expected life span of the device (i.e., the time for which the flash memory will operate properly) decreases.

FIG. 1 is a block diagram illustrating the memory cell region of a conventional flash memory device. As shown in FIG. 1, the memory cell region of the flash memory device may be divided into a plurality of logical areas, including a map area, a log block area, a data block area, an erasable block area and a free block area. Each area may include one or more memory blocks. Herein, the memory blocks in the log block area are referred to as "log blocks," the memory blocks in the data block area are referred to as "data blocks," the memory blocks in the erasable block area are referred to as "erasable blocks," and the memory blocks in the free block area are referred to as "free blocks."

A data block stores normal data. A log block is used to update part or all of a data block by recording the updated content in the log block. Accordingly, a log block corresponds to at least one data block and stores updated pages of the corresponding data block or blocks. Pages stored in the log block are referred to prior to corresponding pages stored in the data block. Data in a log block may be periodically merged with data in the corresponding data block(s).

FIG. 2 is a state diagram illustrating the state transitions of memory blocks of a conventional flash memory device when memory blocks are merged with each other. The conventional state transitions illustrated in FIG. 2 are disclosed in Korean Patent Publication No. 10-2002-0092487. As shown in FIG. 2, when, for example, a log block is subjected to a simple merge operation, the log block becomes an erasable block. An erasable block is a block that needs to be erased before it can be reused.

FIG. 3 is a schematic diagram illustrating log blocks after a conventional simple merge. As shown in FIG. 3, after conventional simple merge operations, the log blocks may have various amounts of data programmed therein. In particular, some log blocks may store a significant amount of data, while other log blocks may only store a small amount of data (e.g., one or two pages). After the simple merge, the log blocks are all discarded to a garbage pool (i.e., the log blocks are defined as erasable blocks). The erasable blocks may thereafter be erased, after which they become free blocks as shown in FIG. 2.

SUMMARY

Pursuant to some embodiments of the present invention, methods of operating a non-volatile memory device that includes a first data block that stores first data and a first log block that stores an updated version of at least some of the first data are provided. Pursuant to these methods, valid portions of the first data in the first data block are copied to a free block that has no data to generate a second data block. The updated version of at least some of the first data from the first log block is copied to the second data block. The first log block is designated as a reusable log block without erasing the data therefrom in response to at least one predetermined condition being satisfied. The non-volatile memory device may comprise, for example, a flash memory device.

In some embodiments, the first log block may be designated as a reusable log block without erasing the data therefrom by determining an amount of clean memory in the first log block, and then comparing the determined amount of clean memory with a predetermined reference value. If the determined amount of clean memory in the first log block exceeds the predetermined reference value, the first log block is designated as a reusable log block without erasing the data therefrom. The amount of clean memory may be a number of clean pages in the first log block. The first log block may be designated as a reusable log block by, for example, recording an identifier of the first log block (e.g., a physical block number) and a clean page start address that is associated with the first log block in a reuse pool table. The predetermined reference value may, for example, be about ½ of a total number of pages in the first log block.

In some embodiments, the methods may further involve recording an updated version of at least some of second data that is stored in a second data block into the reusable log block without erasing the first data from the reusable log block. This may be accomplished, for example, by receiving the updated version of at least some of the second data, and then determining that the updated version of at least some of the second data is to be stored in a new log block that is not a free memory block. The reusable log block is then selected as the new log block, and the updated version of at least some of second data that is stored in the second data block is recorded into the reusable log block.

In further embodiments of the present invention, methods of operating a non-volatile memory device are provided which involve recording first data into a first memory block of the non-volatile memory device, where the first memory block contains both erased pages and pages containing second, previously recorded data that is no longer valid. In these methods, prior to recording the data into the first memory block, the first memory block may be designated as a reusable memory block in response to determining that a number of erased pages in the first memory block exceeds a reference value. A first address of the first memory block may be stored that designates a first of a set of erased pages of the first memory block.

According to still further embodiments of the present invention, methods of operating a non-volatile memory device are provided which involve merging first data stored in a first log block of the non-volatile memory device with second data stored in a first data block of the non-volatile memory device by recording the first data and the second data into a second data block of the non-volatile memory device. Then, the number of clean pages in the first log block is determined and compared to a reference value. If the number of clean pages exceeds the reference value, then the first log block is allocated to a reusable log block pool. If instead the number of clean pages is less than or equal to the reference value, then the first log block is allocated to an erasable log block pool.

Pursuant to further embodiments of the present invention, non-volatile memory devices are provided that include a first memory in which a program is stored, a second memory that includes a data block and a log block in which data for updating the data block is recorded and a processor that is configured to execute the program to manage the second memory. In these embodiments, the processor may be configured to copy valid data in a first data block and valid data in a first log block that corresponds to the first data block to a free block having no data to generate a second data block and to allocate the first log block as a free block after erasing the data from the first log block or to allocate the first log block as a second log block without erasing the data from the first log block, based on predetermined conditions. In such devices, the first memory may, for example, be a read-only memory and the second memory may, for example, be a flash memory.

Pursuant to further embodiments of the present invention, non-volatile memory devices are provided that include a memory cell region that is divided into a plurality of logical areas including a log block area, a data block area, an erasable block area, a free block area and a reusable block area and a processor. In these devices, the data block area may include a plurality of data blocks that store data that is input into the non-volatile memory device. The log block area may include a plurality of log blocks that store updates to the data stored in the data block area. The erasable block area may include a plurality of erasable blocks that are awaiting erasure. The free block area may include a plurality of erased memory blocks. The reusable block area may include at least a first log block that was assigned to the reusable block area without undergoing an erasure operation after updated data in the first log block was recorded into another block as part of a merge operation.

BRIEF DESCRIPTION OF THE DRAWINGS

The above and other features and advantages of the present invention will become more apparent by describing in detail exemplary embodiments thereof with reference to the attached drawings in which:

FIG. 9 is a block diagram illustrating a reuse pool table according to some embodiments of the present invention.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As described above, according to conventional technology, a log block will be discarded (i.e., allocated for erasure) after a simple merge operation involving the log block is completed even if data has been recorded into only a small part of the log block. As such, the erase count of conventional flash memory devices are increased. As discussed herein, pursuant to embodiments of the present invention, non-volatile memory devices are provided which may have increased performance and/or life because these devices re-utilize log blocks that are discarded according to conventional technique in order to reduce the erase count of the device. Related methods of managing these non-volatile memory devices are also disclosed.

Figure 1:
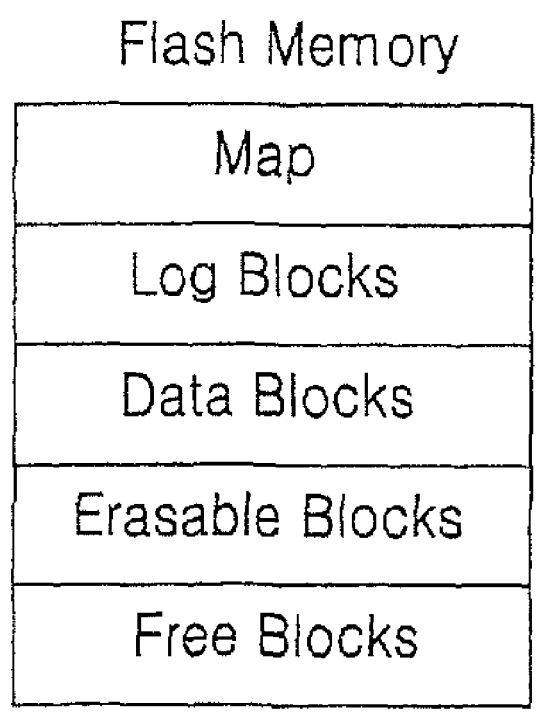
FIG. 1 is a block diagram illustrating a memory cell region of a conventional flash memory device.
Figure 2:
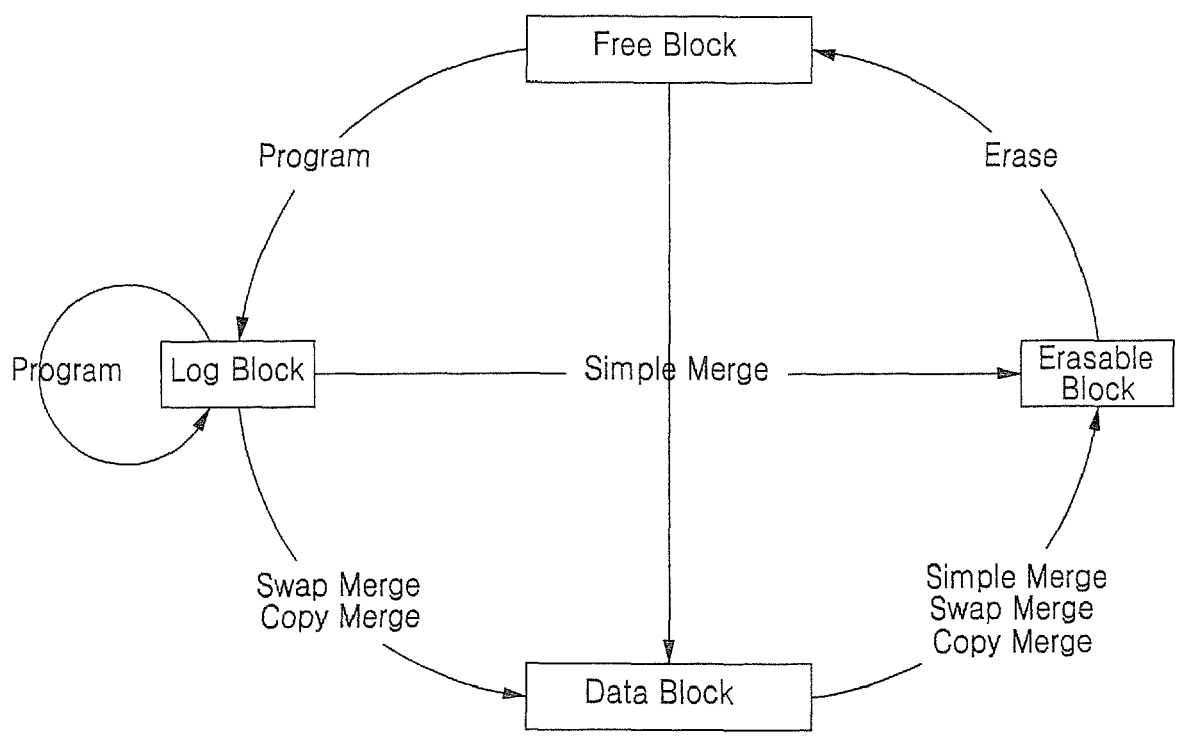
FIG. 2 is a state diagram illustrating state transitions of memory blocks of a conventional flash memory device when memory blocks are merged with each other according to conventional methods.
Figure 3:
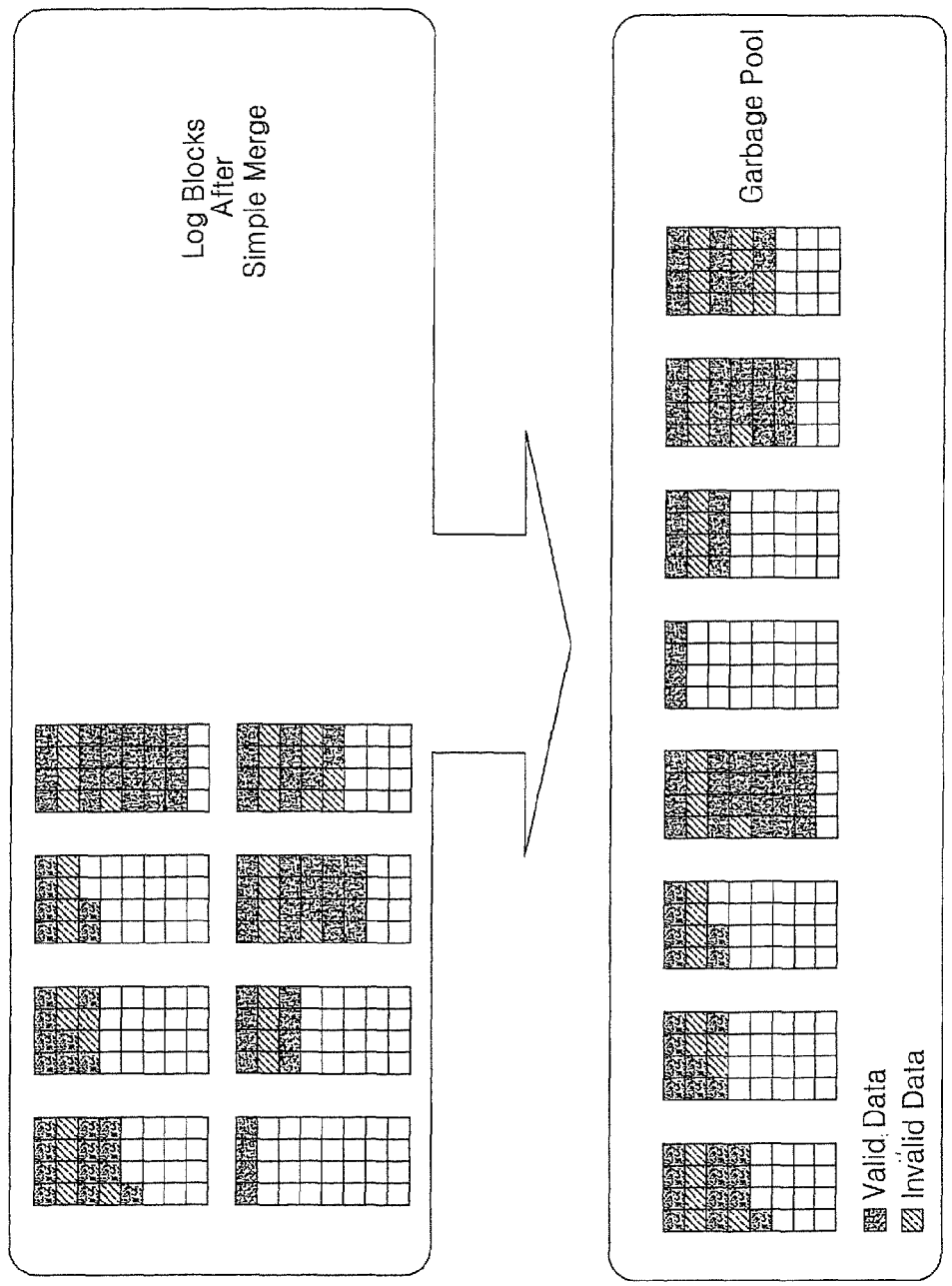
FIG. 3 is a schematic diagram illustrating the allocation of log blocks of a flash memory device after conventional simple merge operations are performed.
Figure 4:
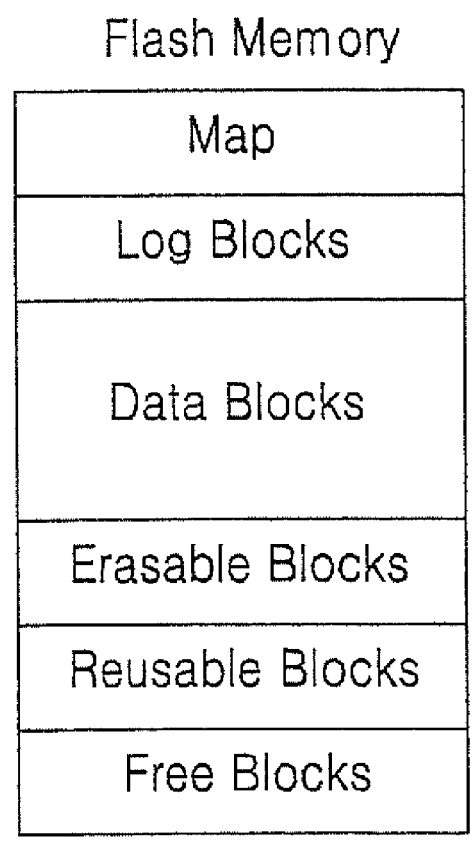
FIG. 4 is a block diagram illustrating a memory cell region of a flash memory device according to some embodiments of the present invention.

FIG. 4 is a block diagram illustrating a memory cell region of a flash memory device according to some embodiments of the present invention. As shown in FIG. 4, the memory cell region of the flash memory device may be divided into a map area, a log block area, a data block area, an erasable block area, a reusable block area, and a free block area. Each of these areas may be logically defined. Thus, it will be appreciated that these areas may be physically mingled and/or discontinuous.

The map area may be used to store address conversion information for each block to enable block addressing. The map area may also store tables, lists and/or other data structures that may be used to manage the memory blocks in each area.

The log block area includes log blocks, which will be described in more detail herein. The data block area is used to record normal data. The erasable block area includes blocks which are awaiting erasure. Herein, these blocks are referred to as erasable blocks or discarded blocks. An eraseable block may become a free block by erasing the data therein. The free block area includes free blocks that may be allocated as log blocks or data blocks. The free blocks may also be allocated to the map area. The free blocks do not include any data (i.e., a free block is a block from which any data previously stored therein has been erased). The reusable block area includes blocks that can be allocated to (or maintained in) the log block area without first performing an erase operation thereon.

As noted above, data typically cannot be overwritten in an conventional flash memory device such as, for example, a conventional NAND flash memory device. As such, when updated data is received, it may be stored in a temporary memory block which is referred to as a log block. As only a finite number of log blocks will be provided in a flash memory device, at some point all of the log blocks may become partially and/or completely filled with data. To ensure that log blocks are available to record new or updated data, periodically data that is stored in a log block may be compared with data stored in a corresponding data block to identify (1) unchanged information in the data block (which is valid data since the data has not been updated) and (2) updated data in the log block (which is also valid data that needs to replace the old data in the data block). Once this identification is completed, the data block and the log block may be merged into a single block in order to, for example, empty the log block. This procedure is referred to as a "data merge" or simply as a "merge." Three different types of merge operations may be performed. These three types of merges are referred to as simple merges, copy merges, and swap merges, each of which will be described in further detail below.

Figure 5:
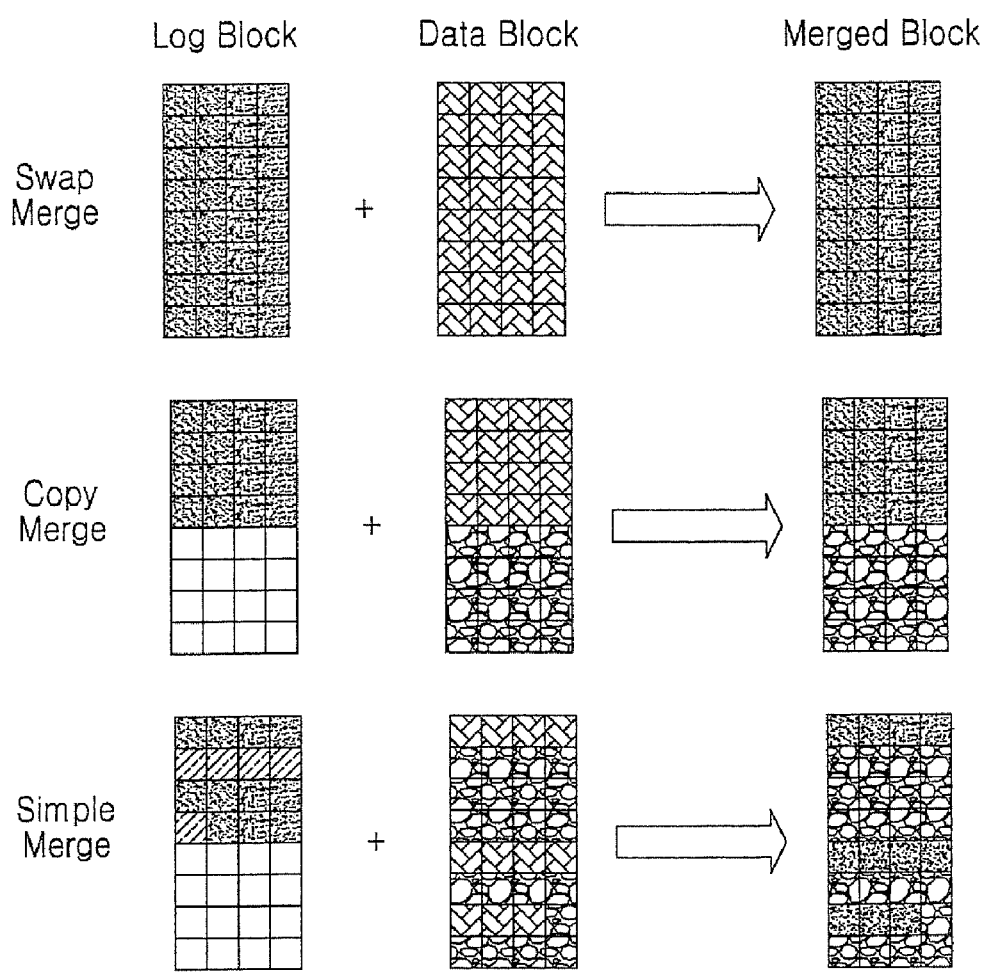
FIG. 5 is a schematic diagram illustrating data merge operations that may be used to merge memory blocks according to some embodiments of the present invention.

FIG. 5 is a schematic diagram illustrating three exemplary merges of a log block with a corresponding data block according to some embodiments of the present invention.

As shown in FIG. 5, in a swap merge, all of the data in a data block is replaced or updated with data that is stored in a corresponding log block. As a swap merge does not involve merging selected data from two different blocks (but instead involves replacing all of the data in a data block with the data stored in a corresponding log block), the swap merge may be performed by simply modifying the memory block mapping to redesignate the log block as a data block. Accordingly, a swap merge may be performed without having to actually copy or rewrite any actual data. A swap merge may only be performed in certain circumstances such as, for example, when every page in the data block has been updated only once, and the log block and the data block have the same page arrangement. The mapping replacement can be accomplished, for example, by updating the address conversion information in the map area of the flash memory device so that the log block is mapped to a logical address requested by a user. Since a swap merge only involves block mapping, it does not require an additional memory block to be performed. After the swap merge is completed, the log block becomes a data block and the data block may be discarded (i.e., the data block becomes an erasable block that is awaiting erasure).

The copy merge is performed when updated data is received for, by way of example, an upper address portion of a data block. The updated data may be recorded into, for example, an upper address portion of a log block. The copy merge is used to copy the data stored in the remainder of the data block to, for example, a lower address portion of the log block that contains the updated data. As illustrated in FIG. 5, when only the data at the upper address portion of the data block needs to be updated, the data at the upper address portion of the log block (i.e., the updated data) is valid. On the other hand, the data currently stored at the upper address portion in the data block needs to be updated and hence is invalid, while the data stored at the lower address portion of the data block remains valid (since updated data has not been received for this data). Thus, with the copy merge, the valid data from both the log block and the corresponding data block are merged together into a single block (in this example, the log block) by copying the valid data in the data block to the log block. The copy merge need not involve an additional (third) block. The copy merge may then be completed by modifying the memory block mapping to redesignate the log block as a data block. After the swap merge is completed, the data block may be discarded.

A simple merge may be performed when data in a data block is discontinuously updated. With a simple merge, a new data block is formed by copying (recording) valid data in the log block (i.e., received updated data) and valid data in the corresponding data block (i.e., data that has not been updated) into a third block. After the simple merge is completed, the data block is discarded (i.e., it becomes an erasable block) and the log block transitions to either an erasable block or a reusable block. The simple merge may be performed when the page arrangement in the log block is different from the page arrangement in the data block.

Figure 6:
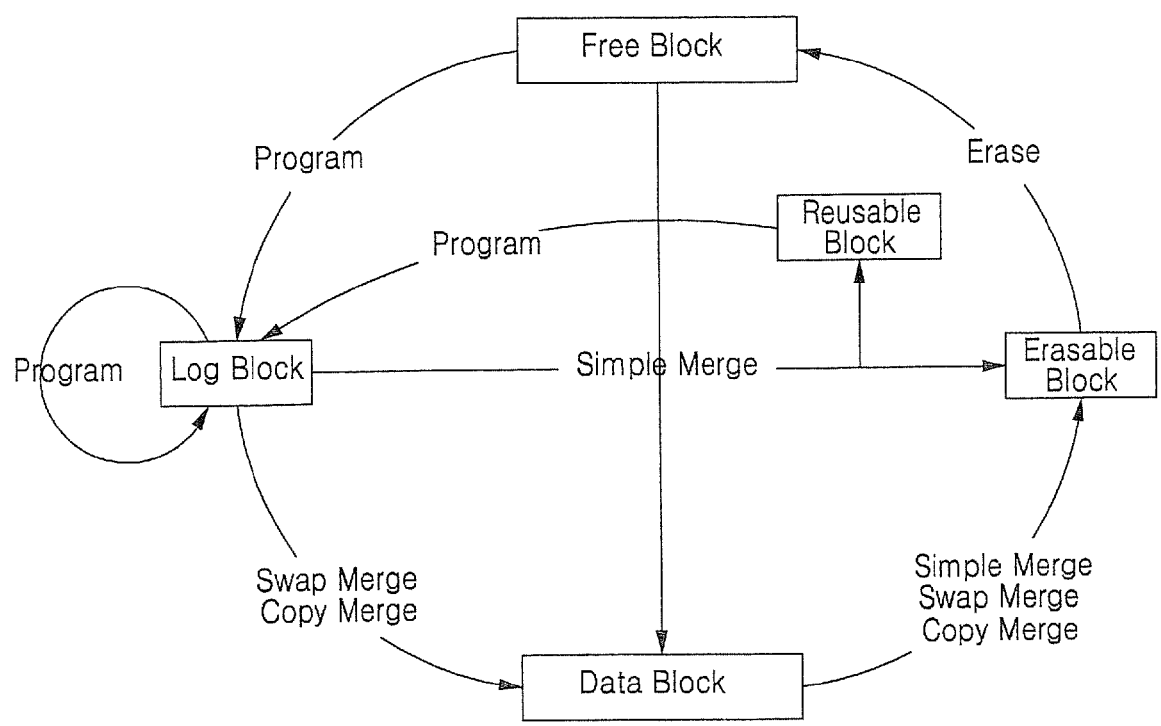
FIG. 6 is a state diagram illustrating state transitions of memory blocks of flash memory devices according to some embodiments of the present invention.

FIG. 6 illustrates the state transitions of memory blocks according to some embodiments of the present invention. As shown in FIG. 6, a log block may transition to a data block through either a swap merge or a copy merge, and may transition to an erasable block or a reusable block through a simple merge. A reusable block may transition to a log block through a program operation. As is also shown in FIG. 6, a data block is discarded after a swap merge, a simple merge or a copy merge, and thus transitions to an erasable block. An erasable block transitions to a free block through an erase operation. A free block may transition to a log block through a program operation, or to a data block through a simple merge.

In order to manage the data merge process, the flash memory device may have an associated processor (not shown). This processor needs access to information regarding each block. Accordingly, one or more tables for managing each memory area in the flash memory device may be maintained. For example, a free block management table may be maintained that includes a list of free blocks, an erasable block management table may be maintained that includes a list of erasable blocks, a log block management table may be maintained that includes a list of log blocks, and a data block management table may be maintained that includes a list of data blocks. Each of the tables may be implemented using a data structure such as, for example, an array, a linked list, a queue or the like, and may, for example, store a physical block number (PBN) or other indicia associated with each respective block. Such a data structure for managing discarded blocks is referred to herein as a garbage pool.

In order to manage flash memory according to some embodiments of the present invention, a reusable block management table may be maintained that includes a list of reusable blocks. The reusable block management table may also be implemented as a data structure such as an array, linked list, queue or the like. The reusable block management table may store both a PBN or other indicia of a reusable block along with a start address of an empty page in the block. The data structure for managing reusable blocks is also referred to herein as a reuse pool. All of the above-described tables may be stored, for example, in the map area of the flash memory device.

Figure 7:
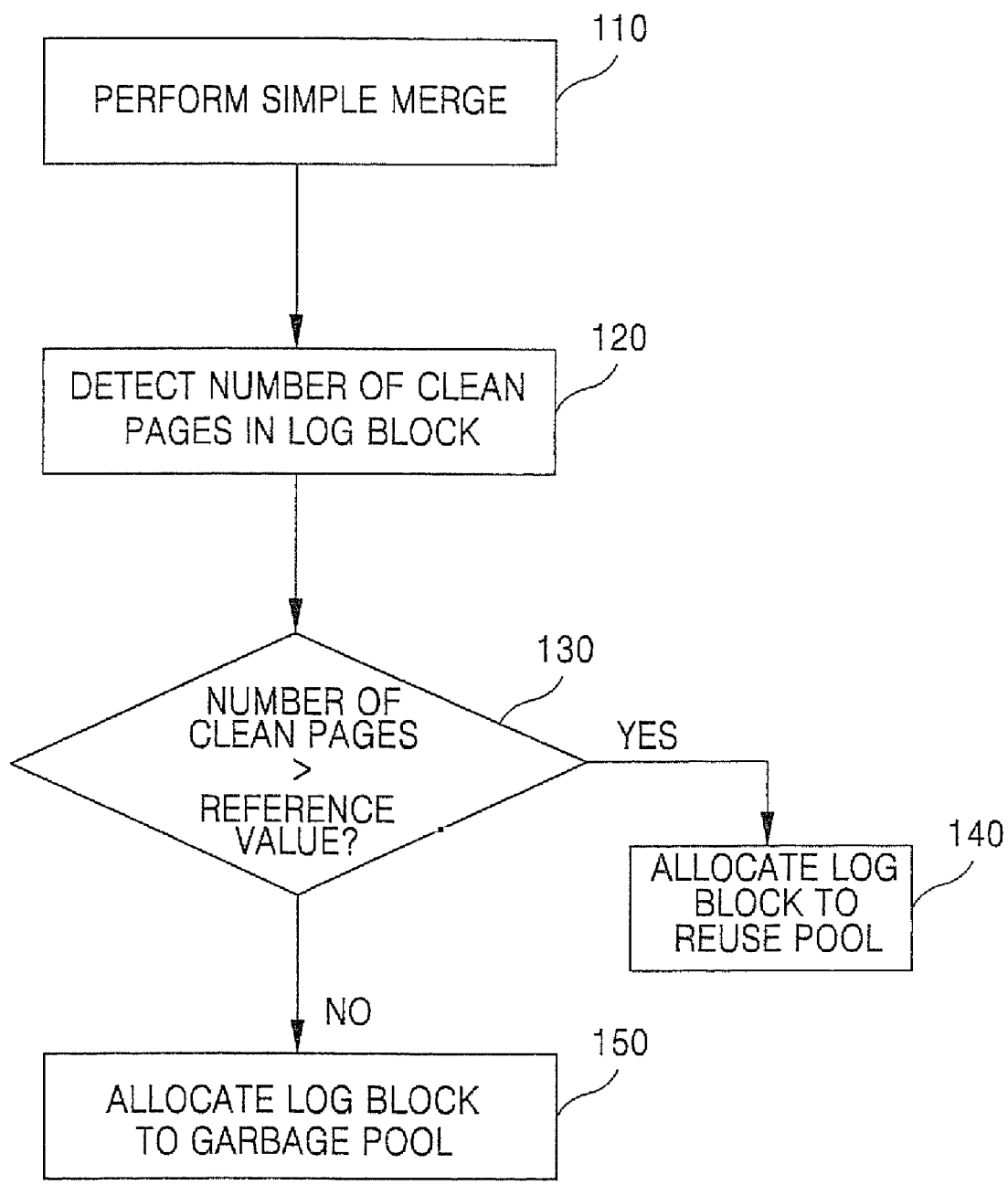
FIG. 7 is a flowchart illustrating methods of processing a log block after a simple merge operation according to some embodiments of the present invention.

FIG. 7 is a flowchart of a method of processing a log block after a simple merge according to some embodiments of the present invention. As shown in FIG. 7, a simple merge is first performed (block 110). After the simple merge, the log block becomes an invalid log block that does not have valid data. Next, the amount of empty memory (i.e., the number of "clean" pages that have not had data written to the page since the last time the page was erased) in the invalid log block is detected (block 120). Then, the detected number of clean pages is compared with a predetermined reference value, e.g., a reference page count (block 130). When the number of clean pages is greater than the reference page count, the invalid log block is allocated to the reuse pool together with a "clean page start address" that specifies the address of the first clean page (block 140). A reusable block that is placed in the reuse pool can be used as a log block without first performing an erase operation thereon.

When the number of clean pages is less than or equal to the reference page count, the invalid log block is allocated to the garbage pool (block 150).

Figure 8:
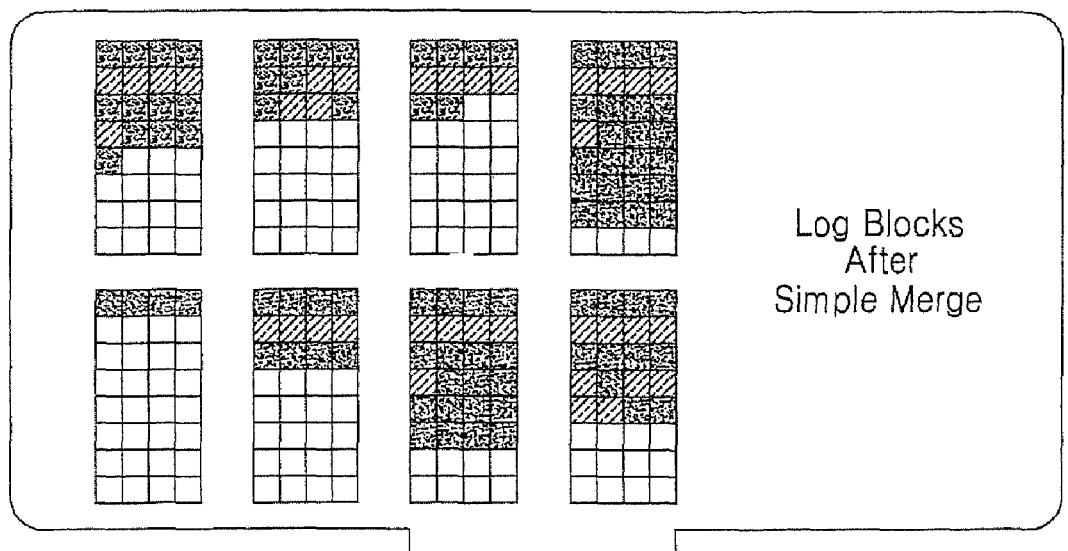
FIG. 8 is a schematic diagram illustrating the allocation of log blocks after a simple merge operation according to some embodiments of the present invention.
Figure 8:
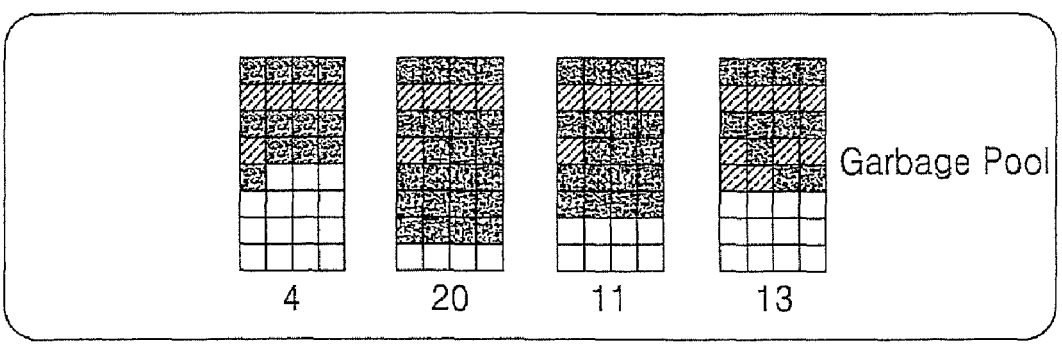
Figure 8:
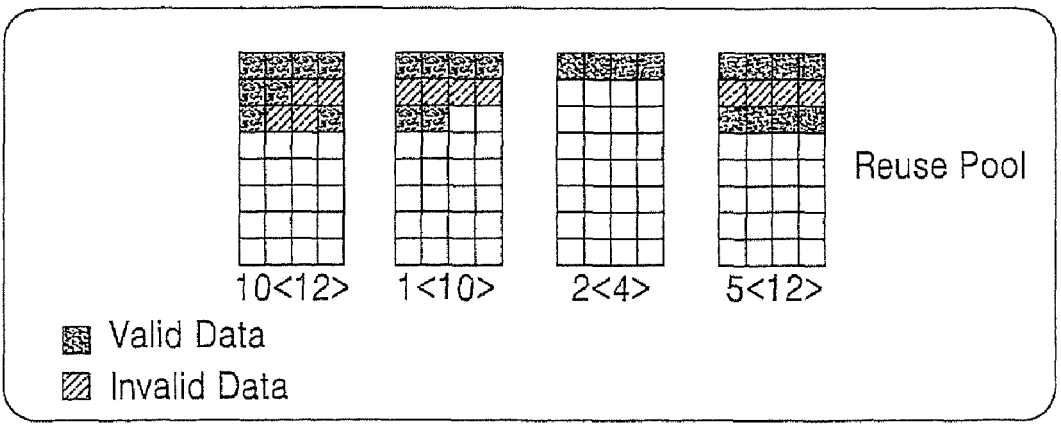

FIG. 8 is a schematic diagram that illustrates the states of a plurality of exemplary log blocks after simple merge operations are performed according to some embodiments of the present invention. As shown in FIG. 8, a plurality of log blocks are subjected to simple merge operations. Some of the log blocks included a relatively large amount of data, while other of the log blocks included only a relatively small amount of data. Using conventional flash memory device memory management techniques, all of the log blocks would be discarded and allocated to the garbage pool, regardless of the amount of programmed data in each log block.

However, according to some embodiments of the present invention, the log blocks are classified after the simple merge depending upon the amount of data that was programmed into each log block. In particular, when the number of pages in the log block that includes programmed data exceeds the reference value, the log block is allocated to the garbage pool. When the number of pages in the log block that include programmed data is less than or equal to the reference value, the log block is instead allocated to the reuse pool.

Referring again to FIG. 8, the log blocks having PBNs of 4, 20, 11 and 13, respectively, are allocated to the garbage pool and the log blocks having PBNs of 10, 1, 2, and 5, respectively, are allocated to the reuse pool. In FIG. 8, the designations <12>, <10>, <4> and <12> represent a start address of a clean page in a corresponding block. In this exemplary embodiment, the reference value is set to be 50% (i.e., ½) of the total number of pages in a block. However, the reference value may be set to other values.

FIG. 9 illustrates a reusable block management table according to some embodiments of the present invention. When a log block is allocated to the reuse pool, the PBN of the log block and a starting address of the first clean page in the log block (i.e., a clean page starting number) are recorded together in the reusable block management table.

Figure 10:
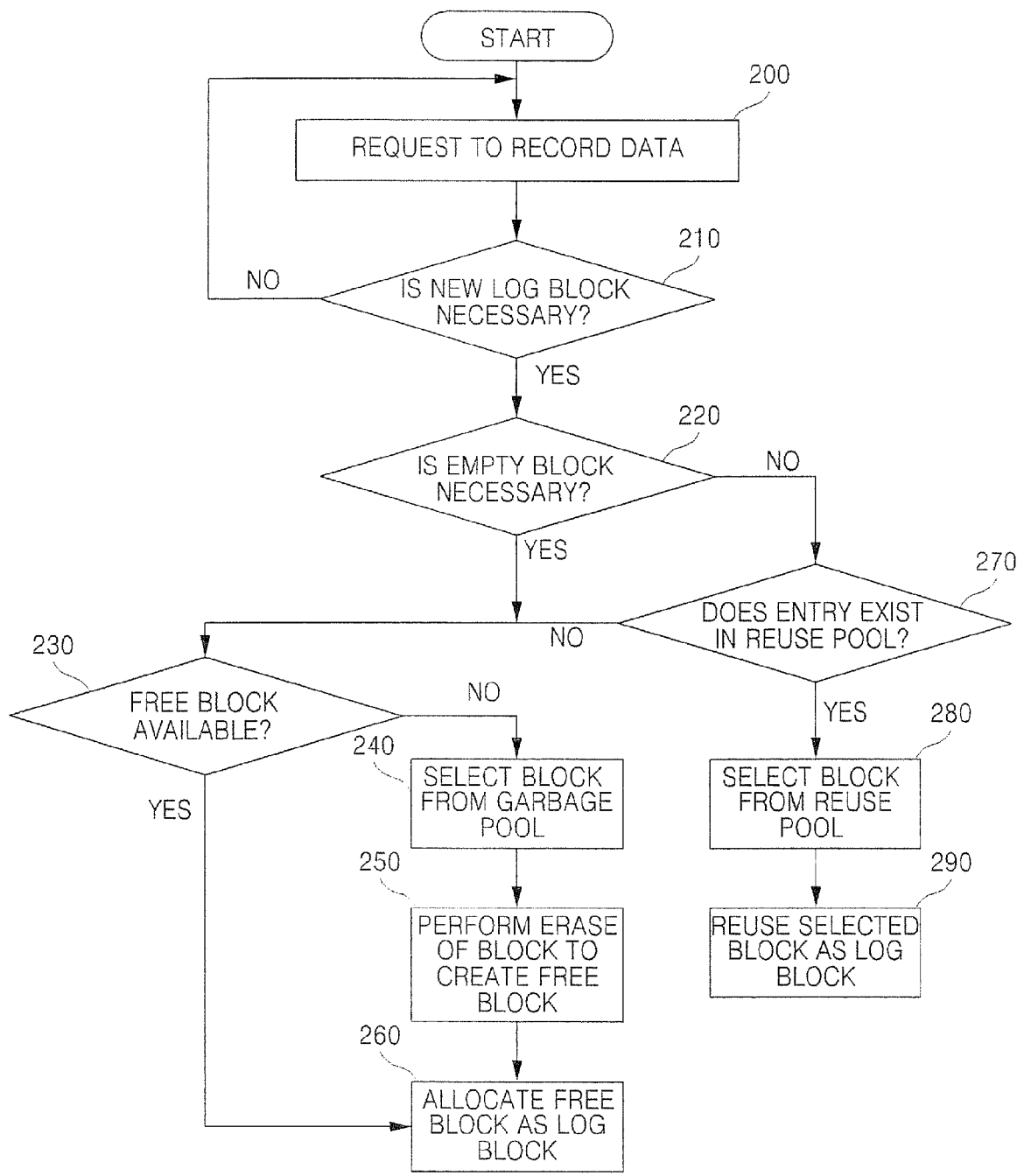
FIG. 10 is a flowchart illustrating methods of allocating a new log block according to some embodiments of the present invention.

FIG. 10 is a flowchart illustrating methods of allocating a new log block according to some embodiments of the present invention. As shown in FIG. 10, a request is received for recording or updating data stored in the flash memory (block 200). In response to this request, a decision is made as to whether or not a new log block is necessary for recording the data (block 210). If a new log block is not necessary, operations return to block 200 where another request to record data will eventually be received. If instead it is determined that a new log block is necessary, it is then determined whether an empty block in which no data has been written (i.e., a free block) is needed (block 220). If an empty block is necessary, next a determination is made as to whether or not a free block is presently available (block 230). If so, a free block is allocated as the new log block into which the updated data is to be recorded (block 260). If instead a free block is not available, then a block is selected from the garbage pool (block 240) and the selected block is then erased to create the free block (block 250), which is then allocated as the log block (block 260).

If the request to record data specifies an address corresponding to the first page of a block, it is typically necessary to obtain an empty block at decision block 220 of FIG. 10. However, in other instances an empty block is not necessary. In this situation, the method of FIG. 10 proceeds from decision block 220 to decision block 270, where it is determined whether at least one reusable block exists in the reuse pool. If so, a reusable block is selected from the reuse pool (block 280), and the selected block is re-used as a log block (block 290). The log block has an associated clean page start address (or a clean page starting number) and data is written starting at the clean page that corresponds to the clean page starting number.

The above-described method for managing flash memory according to some embodiments of the present invention can be used for a flash memory based device. The flash memory based device includes at least one flash memory and a processor for managing the flash memory and may be, for example, a smart card or SD (secure digital) card. The flash memory based device may further include memory, e.g., read-only memory (ROM), for storing a program. For clarity of the description, the memory for storing a program is referred to as a first memory and the flash memory is referred to as a second memory in the flash memory based device.

The above-described method for managing flash memory according to some embodiments of the present invention may be implemented as a program stored in the first memory that is run on the processor. The processor may manage the second memory by executing the program stored in the first memory.

A method of managing flash memory according to some embodiments of the present invention may be embodied as a program and stored in a recording medium.

According to some embodiments of the present invention, among log blocks that become invalid due to a merge operation, log blocks having over a predetermined percent of clean pages are not erased, and instead are reused as new log blocks, so that an erase count of the device is reduced. As a result, the life span of flash memory having a limited program/erase count can be expanded. In addition, a new log block may be selected from the reuse pool and used immediately without performing an erase operation. Accordingly, time for the erase is not necessary, and therefore, performance may be improved. When the randomness of a pattern of recorded data increases, the frequency at which simple merge of log blocks that have significant amounts of unused space may increase. The present invention may be particularly effective when the frequency of simple merges is high, when the block size is large, and/or when the number of unused log and free blocks is small.

The present invention has been described herein with reference to block diagrams and/or flowchart illustrations of methods, devices and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor or other programmable data processing apparatus to produce a machine, such that the instructions, which execute via the processor or other programmable data processing apparatus, create means (functionality) and/or structure for implementing the functions/acts specified in the block diagrams and/or flowchart block or blocks.

These computer program instructions may be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks. The computer program instructions may also be loaded into a processor or other programmable data processing apparatus to cause a series of operational steps to be performed to produce a computer-implemented process such that the instructions which execute on the processor or other programmable apparatus provide steps for implementing the functions/acts specified in the block diagrams and/or flowchart block or blocks.

Accordingly, aspects of the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

While the present invention has been shown and described with reference to exemplary embodiments thereof, it will be understood by those of ordinary skill in the art that various changes in form and detail may be made herein without departing from the spirit and scope of the present invention, as defined by the following claims.

What is claimed is:

1. A method of operating a non-volatile memory device that includes a first data block that stores first data and a first log block that stores an updated version of at least some of the first data, the method comprising:
    copying valid portions of the first data in the first data block to a free block that has no data to generate a second data block;
    copying the updated version of at least some of the first data from the first log block to the second data block;
    designating the first log block as a reusable log block without erasing the data therefrom in response to at least one predetermined condition being satisfied;
    recording an updated version of at least some of the data stored in the second data block or a third data block into clean memory of the first log block after the first log block is designated as a reusable log block,
    wherein the first, second and third data blocks are different data blocks,
    wherein designating the first log block as a reusable log block without erasing the data therefrom in response to at least one predetermined condition being satisfied comprises:
    determining an amount of clean memory in the first log block;
    comparing the determined amount of clean memory with a predetermined reference value; and
    designating the first log block as a reusable log block without erasing the data therefrom based on the determined amount of clean memory in the first log block exceeding the predetermined reference value.

2. The method of claim 1, wherein the non-volatile memory device is a flash memory device.

3. The method of claim 2, wherein the amount of clean memory is a number of clean pages in the first log block, and wherein designating the first log block as a reusable log block without erasing the data therefrom comprises recording an identifier of the first log block and a clean page start address that is associated with the first log block in a reuse pool table.

4. The method of claim 3, wherein the identifier of the first log block comprises a physical block number of the first log block.

5. The method of claim 3, further comprising recording an updated version of at least some of second data that is stored in a second data block into the reusable log block without erasing the first data from the reusable log block.

6. The method of claim 5, wherein recording the updated version of at least some of second data that is stored in the second data block into the reusable log block without erasing the first data from the reusable log block comprises:

receiving the updated version of at least some of the second data;

determining that the updated version of at least some of the second data is to be stored in a new log block;

determining that the new log block need not be a free memory block;

selecting the reusable log block as the new log block; and recording the updated version of at least some of second data that is stored in the second data block into the reusable log block.

7. The method of claim 1, wherein the predetermined reference value is about ½ of a total number of pages in the first log block.

8. A recording medium storing a program for executing the method of claim 1.

9. A non-volatile memory device, comprising:

a non-volatile memory including a first data block and a first log block that corresponds to the first data block in which data for updating the first data block is recorded; and a processor configured to manage the non-volatile memory, wherein the processor is configured to copy valid data in the first data block and valid data in the first log block to a free block having no data to generate a second data block, and wherein the processor is further configured to allocate the first log block as a third log block without erasing the data from the first log block to record an updated version of at least some of data stored in the second data block or a third data block into clean pages of the first log block, wherein the processor is further configured to designate the first log block as a reusable log block without erasing the data therefrom in response to at least one predetermined condition being satisfied by determining an amount of clean memory in the first log block, comparing the determined amount of clean memory with a predetermined reference value, and designating the first log block as a reusable log block without erasing the data therefrom based on the determined amount of clean memory in the first log block exceeding the predetermined reference value, and wherein the processor is further configured to record an updated version of at least some of the data stored in the second data block or a third data block into clean memory of the first log block after the first log block is designated as a reusable log block, based on predetermined conditions.

10. The memory based device of claim 9, wherein non-volatile memory is a flash memory.

* * * * *